June 11, 1929.                    G. R. YOUNG                    1,717,135
                              HURDLE FOR RACETRACKS
                              Filed Sept. 27, 1926
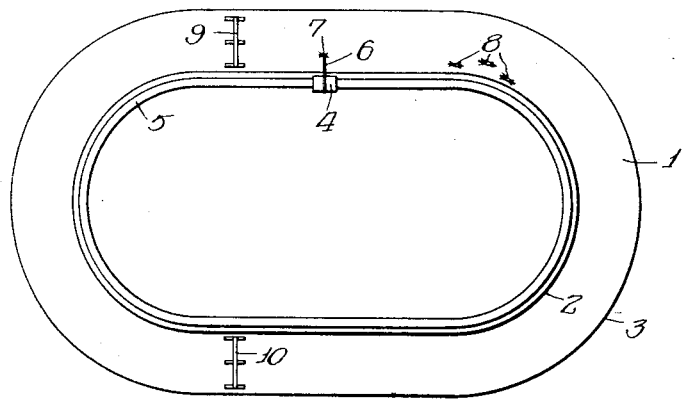
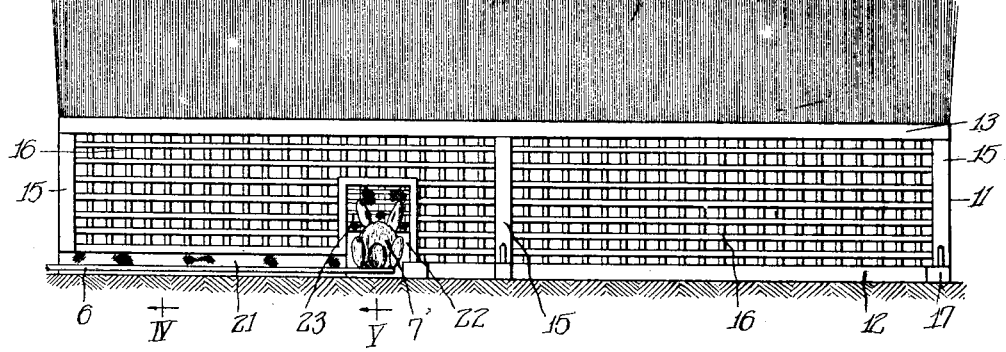
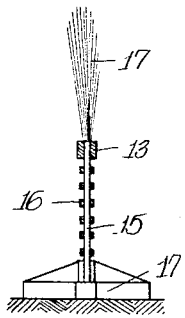 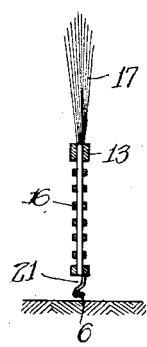 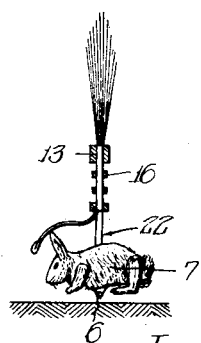
Witness:
A. Burkhardt
Inventor:
George Robert Young,
By Cromwell, Greist & Warden
            Attys.

Patented June 11, 1929.

1,717,135

UNITED STATES PATENT OFFICE.

GEORGE ROBERT YOUNG, OF NEVADA, MISSOURI, ASSIGNOR TO ELECTRIC HOLDING CORPORATION, OF CHICAGO, ILLINOIS, A CORPORATION OF DELAWARE.

HURDLE FOR RACETRACKS.

Application filed September 27, 1926. Serial No. 137,848.

My invention relates to hurdles for race tracks, and it has among its objects the provision of an improved hurdle constituting an obstruction in the path of the racing animals and arranged to prevent injuries to the animals in case they fail to clear the hurdle, and also having means for permitting a lure to be moved through the hurdle in front of the racing animals in such manner as to induce said animals to jump over the hurdle.

In the accompanying drawings,

Fig. 1 is a plan diagrammatic view of a race track provided with hurdles made according to my invention;

Fig. 2 is an elevational view of a hurdle embodying my invention;

Fig. 3 is a side elevational view of the hurdle shown in Fig. 2;

Fig. 4 is a sectional view of the hurdle of Fig. 2, along the line IV—IV; and

Fig. 5 is a view similar to Fig. 4 across the portion of the hurdle having the door for the lure, along the line V—V.

In order to train racing dogs, or similar animals, and improve their racing qualities, tracks have been built in which a lure or decoy representing a rabbit or the like, is being driven along the track by means of a carriage running on rails parallel to the track, the moving lure inducing the dogs to run thereafter. Such a racing course is shown in Fig. 1 in which an oval shaped track 1, may be bounded by relatively low fences, 2, 3. A carriage 4, is arranged to be suitably propelled at high speed on rails 5, running parallel to the track 1, and to carry a rod 6, laterally projecting over the track 1, near the ground, and carrying at its end a lure 7, in the shape of a rabbit or the like. By driving the lure or decoy 7, at high speed in front of racing animals, such as dogs 8, they are induced to run after the lure at high speed along the track, thus permitting to test, and compare the relative speeds of, the dogs.

Very often it is desirable to place hurdles, or similar obstacles, along the path of the dogs in order to induce the same to jump over the hurdles, and thus to determine the qualities of the dogs in jumping over obstacles and the like. Two such hurdles are indicated on the track at 9 and 10.

As far as I am aware the hurdles used heretofore in dog races consisted of a substantially rigid barrier or fences disposed across the track in the path of the animals, and severe injuries have very often been caused to the dogs by the rigid structure in case the animal traveling at high speed failed to clear the obstruction.

According to my invention I proved a portable hurdle that may readily be placed across the racing track, and which has a lower substantially rigid member that will support itself on the track, and an upper resilient member that will bend away and permit a racing animal that fails to clear the hurdle to pass therethrough without injury to the animal. The lower rigid member of the hurdle is also provided with a passageway for permitting the lure to be drawn through the hurdle in front of the animal with a door so arranged as to quickly open in front of the lure and momentarily close behind the same so as to prevent the racing dogs running behind the lure from following the latter through the door or passageway.

Such a hurdle is shown in Figs. 2 to 5, and comprises a relatively rigid lower frame 11, which may be made of suitably fitted wooden horizontal beams 12, 13, and vertical posts 15, and a lattice work 16, of lumber, or the like, so supported by the frame as to constitute an obstruction preventing the passage of the racing animals across the same. The bottom beam 12, of the frame has laterally extending leg pieces 17, so arranged as to support the frame 11, with lattice work 16 in vertical position near the ground.

The upper portion of the hurdle is made of brushwood, broom corn, or the like, secured to the upper beam 13 throughout the full width of the hurdle to constitute an upward extension of the barrier formed by the lower frame 11, and the lattice work 16 in the same. With this construction, the upper portion of the hurdle will yield in case a racing animal fails to clear the hurdle and comes in contact with the upper portions thereof, each individual portion throughout the width of the hurdle being resilient and bending out under the impact of the jumping animal and returning immediately thereafter to its normal upward position without injuring the animal.

The lower member 11 of the hurdle is also provided with a door permitting the lure to be driven through the plane of the hurdle without, at the same time permitting the dogs or other animals to following the lure except by jumping over the hurdle. To this end one side of the hurdle, adjacent to the side of the track near which the lure carriage 4 is running, has a passage or clearance 21 near the ground, of sufficient height to permit the lure-carrier rod 6 to pass without hitting the ground or the hurdle, but sufficiently low to prevent the racing animals from passing therethrough.

At the interior portion of the hurdle where the lure 7, mounted on the end of the carrier rod 6, is to pass, there is provided an opening or passageway 22, of sufficient size to permit unobstructed passage of the lure. In order to prevent, however, the animals which run behind the lure to follow through the opening 22, a suitable yieldable door or curtain 23, is so hinged or supported at the upper edge of the opening 22 that it is pushed aside by the lure 6 when moving through the passageway 22 and drops down covering up the passageway immediately after the lure has passed through the plane of hurdle.

Since the lure 7 is traveling at a very high speed, and the passageway 22 in the hurdle is closed all the time except for the extremely brief interval during which it is partially pushed aside by the passing lure, the racing dogs do not realize that there is an opening through which they could pass, and they accordingly jump over the hurdle. This arrangement of a yieldable curtain in the hurdle is also very effective in preventing injuries in case an expensive racing dog tends, in an extreme case, to follow the lure through the door, as the yieldable material of the curtain or door will not injure the dog.

The curtain 23 may be made of any suitable flexible material, such as cloth, or linen, or leather, and it may preferably be painted so as to resemble the lattice work in the adjacent parts of the hurdle.

If desired, a similar curtain may also be provided to cover the opening or clearance 21 near the bottom of the left hand side of the hurdle which provides for the passage of the lure-carrier rod 6.

A hurdle made in accordance with the principles outlined above presents an extremely useful and important accessory in training racing dogs as it constitutes a very efficient obstruction tending to induce the dogs to jump thereover and at the same time embodying full precautions against injuries to the fine and expensive animals.

I claim as my invention:

1. In an animal racing ground in which animals are induced to race by propelling in front of the same a lure along a racing track, a hurdle adapted to be placed across the path of the animals on the track, said hurdle comprising a barrier extending upwardly from near the ground of the track, and constituting an obstruction requiring the animals to jump thereover in the path of travel, said barrier having a closed door, said door being of light weight and so mounted as to momentarily yield upon engagement with the lure to pass the lure when going through the plane of the barrier, and to immediately close itself behind the lure as it passes the door.

2. In combination with an animal racing ground comprising a racing track and means for carrying a lure and propelling the same near the ground of the track to induce animals to race thereafter, of a hurdle arranged to be placed crosswise to the path of the lure along said track for causing animals following the lure to jump over the hurdle, said hurdle having an opening permitting said lure and the associated carrier means to be passed through the plane of the hurdle near the ground, said opening being enclosed by a curtain of yieldable material that may be pushed aside by the moving lure and that returns immediately to a position where it encloses said opening after the lure has pased therethrough.

3. In combination with an animal racing ground, having a track, a carriage propelled on rails external to said track, a rod extending from said carriage to a point near the ground on said track, said rod being moved by said carriage on said track, and a lure carried by said rod to induce racing animals having a size comparable to that of said lure to race thereafter, of a portable hurdle adapted to be placed across said track in the path of travel of said lure, said hurdle comprising a substantially rigid base member having means for supporting itself in upstanding position near the ground, said base member having a relatively narrow clearance near the ground throughout a portion of the width on one side thereof to permit said carrier rod to be moved through the hurdle without colliding therewith, the portion of the hurdle opposite the lure having an opening permitting passage of said lure, said opening being enclosed by a member of soft yieldable material that may be pushed aside by the moving lure and will drop back after the same has passed.

4. In an animal racing ground having a track, a carriage propelled on rails external to said track, a rod extending from said carriage to a point near the ground on said track, said rod being moved by said carriage on said track, and a lure carried by said rod to induce racing animals having a size of the order of said lure to race thereafter, a portable hurdle adapted to be placed across the track in the path of travel of said lure to cause the racing animals to jump thereover, said hurdle comprising a substantially rigid base member having means for supporting itself in upstanding position near the ground, said base member having a relatively narrow opening near the ground throughout a portion of the width to permit said carrier rod to be moved through the hurdle without colliding therewith, the portion of the hurdle where the lure is to pass having an opening permitting passage of said lure, said openings for the rod and the lure being enclosed by curtain means of yieldable material that may be pushed aside by the moving rod and lure when passing through the hurdle and returning immediately to the position where they close said openings after the passage of the lure.

5. The combination with an animal racing ground having a track, a carriage propelled on rails on one side of said track, a rod laterally extending from said carriage near the ground of the track to a point in the interior thereof, said rod being movable by said carriage on said track, and a lure carried by said rod to induce racing animals having a size of the order of said lure to race thereafter, of a hurdle adapted to be placed across the track in the path of travel of said lure, said hurdle comprising a substantially rigid base member disposed in upstanding position near the ground, said base member having a relatively narrow opening near the ground throughout a portion of the width on the side toward said carriage to permit said rod to be continuously moved without colliding with said hurdle, the interior portion of the hurdle in front of the path of the lure having an opening permitting the passage of said lure without collision with the rigid portions of said base, said openings for the lure being enclosed by curtain means of yieldable material that may be pushed aside by the moving lure when passing through the hurdle and returning to the position where they close said openings after the passage of the lure, said curtain means having an appearance corresponding to that of the adjacent portions of the hurdle when viewed from the direction in which it is approached by the racing animals.

6. In animal racing apparatus, comprising a race track or course and a mechanically driven lure, in combination with an obstruction adapted to be placed across said race track and having an opening therein through which the lure may pass, flexible means covering said opening and adapted to be deflected by the passing of said lure.

In testimony whereof I have hereunto signed my name.

GEORGE ROBERT YOUNG.